US006421590B2

(12) United States Patent
Thibault

(10) Patent No.: US 6,421,590 B2
(45) Date of Patent: Jul. 16, 2002

(54) PAPERLESS LOG SYSTEM AND METHOD

(75) Inventor: Thomas M. Thibault, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/813,418

(22) Filed: Mar. 20, 2001

Related U.S. Application Data

(63) Continuation of application No. 09/363,971, filed on Jul. 29, 1999, now abandoned.
(60) Provisional application No. 60/138,361, filed on Jun. 10, 1999.

(51) Int. Cl.[7] .......................... F02D 45/00; G05B 15/00
(52) U.S. Cl. .......................... 701/35; 701/200; 701/24; 701/36; 701/33
(58) Field of Search .......................... 701/35, 36, 33, 701/24, 200

(56) References Cited

U.S. PATENT DOCUMENTS 5,452,446 A * 9/1995 Johnson .......................... 707/1
5,633,622 A * 5/1997 Patterson ............... 340/309.15
5,802,545 A * 9/1998 Coverdill ...................... 701/35
5,815,071 A * 9/1998 Doyle ......................... 340/439
5,848,365 A * 12/1998 Coverdill ...................... 701/35
5,880,958 A 3/1999 Helms et al.
5,897,602 A * 4/1999 Mizuta ........................ 701/201
5,922,041 A * 7/1999 Anderson ................... 701/200
5,924,075 A * 7/1999 Kanemitsu ..................... 705/6

FOREIGN PATENT DOCUMENTS

DE 4404800 8/1995
DE 19744419 4/1999
FR 2717595 9/1995

* cited by examiner

*Primary Examiner*—William A. Cuchlinski, Jr.
*Assistant Examiner*—Olga Hernandez
(74) *Attorney, Agent, or Firm*—Philip Wadsworth; Gregory Ogrod; Sandip Minhas

(57) ABSTRACT

A system and method for automatically calculating safety-related compliance data for vehicle operators. Vehicle operators enter an identification code and status information into a mobile communication terminal located on a vehicle. The identification code and status information is generally stored in a memory located within the mobile communication device. The identification code and status information can be transmitted to a central station where it can be processed to determine compliance with safety regulations. The resulting data may be transmitted back to the vehicle upon request. In another embodiment, a processor located within the mobile communication terminal processes the identification code and status information. The resultant data may then be transmitted to the central station or presented to the vehicle operator upon request.

13 Claims, 4 Drawing Sheets

PAPERLESS LOG SYSTEM AND METHOD

This application is a continuation of U.S. Pat. No. application Ser. No. 09/363,971, filed on Jul. 29, 1999, now abandoned, which claims the benefit of U.S. Provisional Application Ser. No. 60/138,361, filed Jun. 10, 1999. These patent applications are incorporated herein by reference in their entirety.

BACKGROUND OF THE INVENTION

I. Field of the Invention

The present invention related generally to the transportation industry and, more particularly to a method and apparatus for automatically recording and calculating safety-related compliance data for vehicle operators.

II. Description of the Related Art

Truck drivers across the United States presently operate under regulations promulgated by the Department of Transportation (DOT) and the Federal Highway Administration (FHWY). The DOT and FHWY regulate many aspects of the transportation industry ranging from vehicle maintenance to substance abuse. One of the more important areas that the DOT and FHWY monitor is the occurrence of truck-related accidents and ways to reduce the number of such accidents.

Driver fatigue has been cited by the DOT and FHWY as being one of the primary causes of truck-related accidents. Consequently, the FHWY has adopted regulations that limit the number of hours that truck drivers may operate a vehicle over a given time period. For example, the DOT prohibits any driver from driving a commercial vehicle in excess of 10 hours and requires 8 hours of rest prior to driving again.

To ensure compliance with these safety regulations, the FHWY also requires drivers to keep detailed written records of the number of hours: (1) driving; (2) on-duty not driving; (3) resting, and; (4) off-duty. Drivers must provide daily updates into a logbook carried with the driver, detailing the number of hours spent in each of the four categories mentioned above. Other information may be required as well, such as the location of where the log book entry occurred, a vehicle identification number, the name of the nearest city at the time of a logbook entry, and so on. A driver must make entries into the log book each time the driver: (1) begins driving; (2) stops driving; (3) starts or ends an “on-duty not driving” period, and; (4) starting or ending a period of rest. Drivers are mandated by federal rules to chart their hours and activities every day by drawing lines on a grid in the log book and calculating the number of hours driving, on-duty not driving, resting, and off duty, over a twenty four hour period.

Federal officials periodically inspect driver logbooks at weigh stations and other locations to certify that they have been kept up-to-date by the driver, and that the driver is following the FHWA mandated regulations. If a driver is found to be out of compliance with the FHWA regulations, he or she will not be permitted to continue driving until the proper amount of off-duty or rest time has elapsed. This results in late deliveries to customers and general inefficiency for the driver’s employer. The driver is also penalized because the mandated “rest” time affects the hours that he/she is able to work. If a number of violations occur over a given time period, substantial fines may be levied against the driver and/or employers.

The logbooks are a nuisance for drivers to fill out and keep current. Consequently, entries are often neglected until well after the time they were supposed to be entered. This may result in erroneous entries, since the driver must rely on memory as to the timing of recordable events. Inaccurate entries into the logbook may be discovered during an audit of the carrier’s records by FHWA officials months, or even years, later.

The logbooks are also susceptible to intentional misrepresentation by vehicle operators. Commercial vehicle operators are sometimes paid by the number of loads delivered, so there is a great incentive for operators to intentionally under-report the hours that they have driven, or to over-report the number of rest hours between driving periods.

What is needed is a way to ensure compliance with safety regulations without the problems associated with the present method for doing so.

SUMMARY OF THE INVENTION

It is an object of the present invention to record and calculate data relating to safety regulations for vehicle operators without the vehicle operator having to fill out complex logbooks and chart their activities.

It is a further object of the present invention to reduce the inconvenience to vehicle operators having to manually record and calculate work hours and activities in a logbook and to keep the logbook up to date.

It is yet another object of the present invention to reduce the number of deliberate and inadvertent safety violations by vehicle operators.

It is still a further object of the present invention to improve driver retention and recruitment by decreasing the chances of problematic roadside inspections and reducing the delays associated with such inspections.

It is still another object of the present invention to allow carriers to track operator hours worked and operator hours available to haul other loads. Carriers can monitor these hours, identify load delivery problems, and make adjustments for on-time delivery, such as swapping loads with other vehicle operators who have available hours.

It is another object of the present invention to keep shippers apprised of load delivery schedules. Carriers can more closely determine a vehicle operator’s ability to meet delivery schedules based on hours worked and the hours available for vehicle operation.

The present invention is a system and method for automatically recording and calculating safety-related compliance data, eliminating the need for vehicle operators to manually record and calculate this data.

In a first embodiment of the present invention, a vehicle operator initially enters an identification number into a mobile communication terminal located on a vehicle assigned to the vehicle operator. A status is also entered at the time the identification number is entered. In the exemplary embodiment, the status indicates whether the vehicle operator is driving, on-duty not driving, resting, or off-duty. When the status of the vehicle operator changes, the vehicle operator enters the new status information into the mobile communication terminal. A memory within the mobile communication terminal stores the identification information and status information for each vehicle operator identified to the mobile communication terminal. A processor connected to the memory calculates the safety-related compliance data. The compliance data can be displayed to a vehicle occupant or transmitted to a central station, where it can be further processed if necessary, forwarded, or stored, as the case may be.

In a second embodiment of the present invention, a vehicle operator enters an identification number into a mobile communication terminal located on a vehicle assigned to the vehicle operator. A status is also entered at the time the identification number is entered. In the exemplary embodiment, the status indicates whether the vehicle operator is driving, on-duty not driving, resting, or off-duty. When the status of the vehicle operator changes, the vehicle operator enters the new status information into the mobile communication terminal. The status and identification information is then transmitted to a central station where it is stored and processed to determine the safety-related compliance data. The compliance data may then be further processed, stored, or forwarded to a remote location. Furthermore, the processed information may be transmitted back to the vehicle as required.

In a third embodiment of the present invention, identification information and status information is entered into a mobile communication terminal located on a vehicle assigned to a vehicle operator. The identification and status information is stored in a memory within the mobile communication terminal. The identification and status information is then transmitted to a central station for processing at predetermined times, in response to a predetermined event, or upon request from the central station. A processor located at the central station calculates the safety-related compliance data, and compares the compliance data to a pre-defined set of safety criteria. The safety-related compliance data and the result of the comparison to the safety criteria can then be further processed, stored, or forwarded to a remote location. Furthermore, the safety-related compliance data and/or result of the comparison can be transmitted back to the vehicle, as required.

BRIEF DESCRIPTION OF THE DRAWINGS

The features, objects, and advantages of the present invention will become more apparent from the detailed description set forth below when taken in conjunction with the drawings in which like reference characters identify like elements throughout and wherein.

DETAILED DESCRIPTION OF THE PREFERRED EMBODIMENTS

The present invention is a method and apparatus for recording and calculating safety-related compliance data for use in the transportation industry. The invention is described in the context of a commercial tractor-trailer vehicle having a mobile communication terminal in communication with a central station using a satellite-based communication system. However, it should be understood that the present invention may be used in terrestrial-based wireless communication systems as well, such as cellular telephone systems, including Advanced Mobile Phone System (AMPS), Time Division Multiple Access (TDMA), Frequency Division Multiple Access (FDMA), Code Division Multiple Access (CDMA), or Global System for Mobile Communication (GSM) systems. Furthermore, the present invention may be used in a variety of vehicles, such as commercial trucks, busses, passenger vehicles, railcars, marine vessels, or airplanes.

Figure 1:
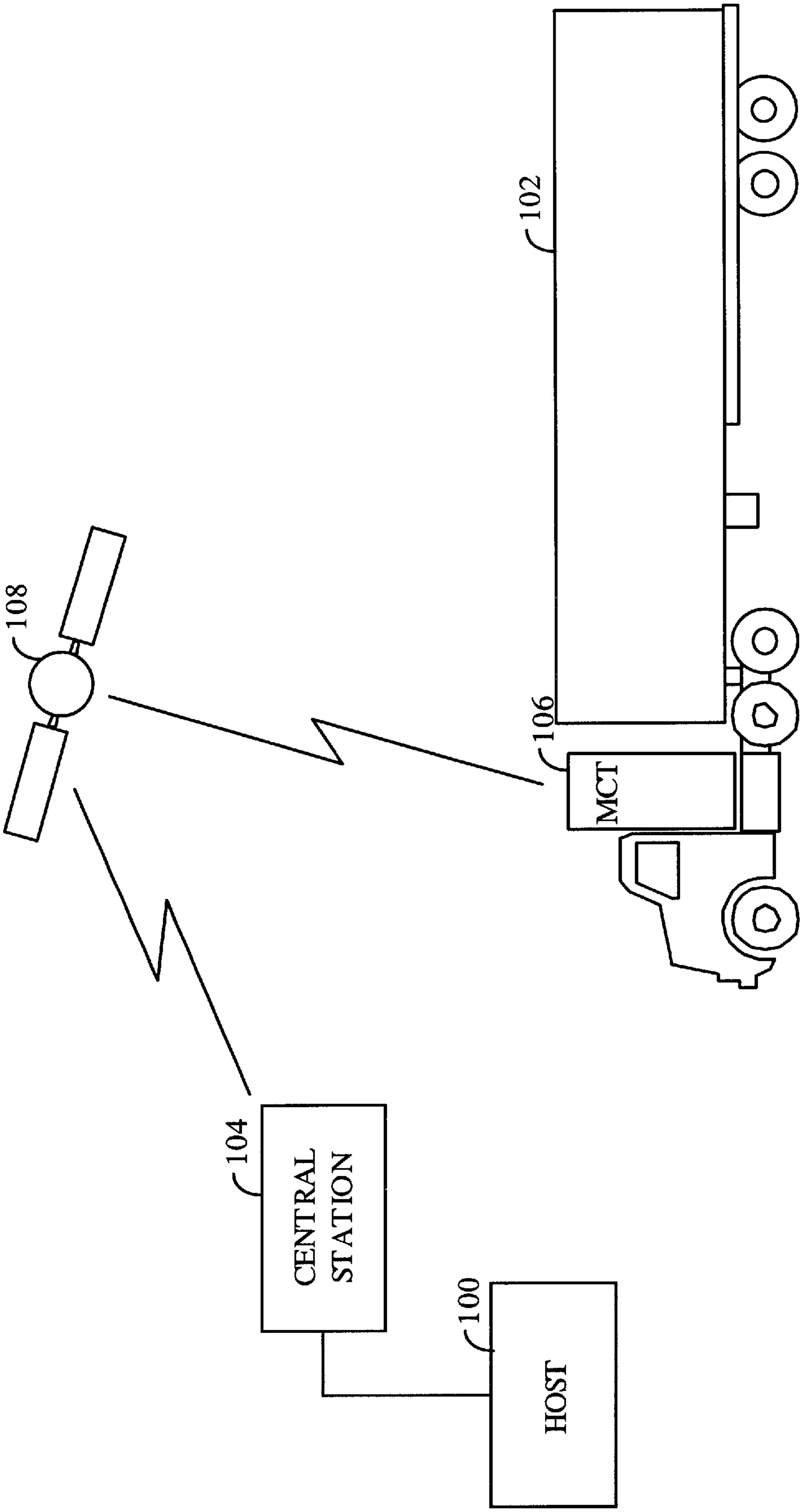
FIG. 1 is an illustration of a wireless communication system in which the present invention is used.

FIG. 1 is an illustration of a wireless communication system in which the present invention is used. Information is communicated between host 100 and ultimately vehicle 102 in the form of voice and/or data communications. Host 100 communicates information to central station 104 using well known communication channels, such as wireline or wireless telephone channels, fiber optic channels, or the like. Host 100 is typically a freight transportation company, otherwise known as a carrier, owning a large fleet of vehicles that are widely dispersed over a large geographic area. Typically, each vehicle comprises a mobile communication terminal (MCT) 106, enabling communications with host 100 by way of satellite 108 and central station 104. Although only one host 100 and one vehicle 102 is shown in FIG. 1, in practice, many hosts 100 use central station 104 to communicate information to and from their respective fleet vehicles.

The information sent by host 100 to central station 104 may comprise voice or data information that is directed to one or more vehicles in the communication system. Information may also originate from central station 104 independently of host 100. In the case of information being transmitted from host 100, central station 104 receives the information and attempts to forward it to the identified vehicle or vehicles, as the case may be. The particular vehicle or vehicles for which the message is intended is identified by specifying an alpha-numeric code, typically a code corresponding to a serial number which has been pre-assigned to MCT 106 installed on vehicle 102. However, any known method may be used to uniquely identify vehicles in the communication system.

In the exemplary embodiment, data is transmitted between vehicle 102 and central station 104 using predefined messages called macros. Each macro is a predefined "template" which contains blank information fields to be filled out by the vehicle operator or a central station employee, as the case may be. The advantage of using macros in a wireless communication system is a reduction in message length, corresponding to a decrease in messaging costs. For example, in the exemplary embodiment, a predefined macro 01 looks like:

I HAVE RECEIVED LOAD INFORMATION AND ON MY WAY. ETA TO SHIPPER IS : DATE_____TIME:_____. I HAVE TRAILER_____, LICENCE NUMBER_____. I NEED DIRECTIONS TO NEXT STOP Y/N_____ .

Rather than transmitting the entire text message above, a vehicle operator simple enters information in the blank fields, and transmits only the information contained within the fields, along with a code that indicates to central station 104 that the information contained within the present message corresponds to macro 01. At central station 104, the information is extracted from the received message in accordance with the structure of the 01 macro. Many other macros are used in modem satellite communication systems today, including macros which indicate arrival at a consignee, vehicle stuck in traffic, trailer loaded, trailer unloaded, and so on.

As stated earlier, vehicle 102, in the exemplary embodiment, comprises a tractor-trailer vehicle widely used in the long-haul transportation industry. In the United States, tractor-trailers are the primary method for the transportation of goods. The commercial transportation industry is regulated by the Department of Transportation (DOT) and the Federal Highway Administration (FHWY), two regulatory agencies created by the United States federal government to ensure safe operation of commercial vehicles on the nation's highways. The DOT and FHWA has determined that many accidents involving commercial vehicles are the result of driver fatigue caused by too many uninterrupted hours of driving. In order to ensure that drivers obtain necessary breaks from continuous driving, the FHWA has established regulations which dictate the number of continuous hours that a vehicle operator may drive, the number of hours of rest required between shifts, and other safety-related criteria.

To ensure compliance with the FHWA regulations, commercial vehicle operators are required to record their daily activities in a logbook, tracking the number of hours that they spend driving, resting, and so on. Under current FHWA regulations, drivers must record the time at which they begin driving, the time at which they stop driving, the time they begin rest, the time that rest terminates, etc. Every 24 hours, vehicle operators must calculate the number of hours spent driving, the number of hours spent on-duty not driving (i.e., the non-driving partner in a two person driving team), the number of hours resting, and the number of hours spent off-duty. In addition to this, drivers must also chart their activities on a graph, for example, a graph similar to one shown in FIG. 2. Commercial vehicle operators must perform this task every twenty four hours or risk a FHWA violation for non-compliance.

Figure 2:
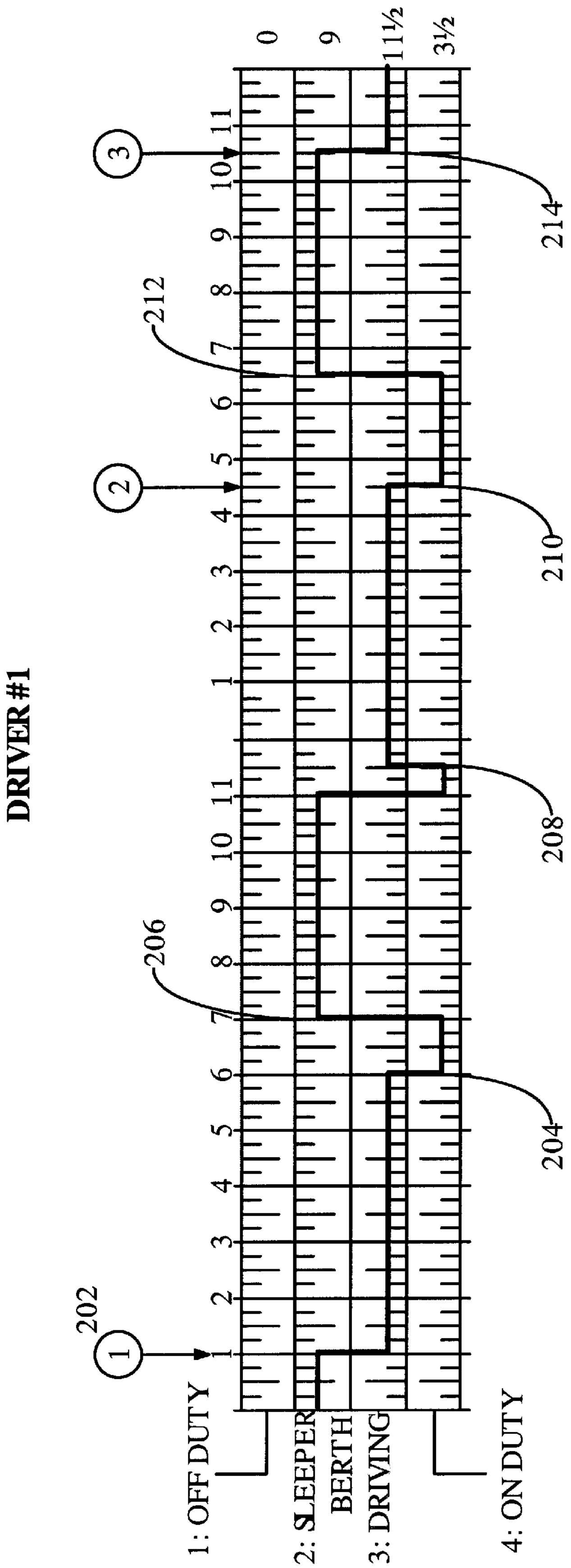
FIG. 2 illustrates a typical driver chart used in prior art logbooks.

FIG. 2 shows an example of a typical chart 200 showing a driver's activities. The chart is derived from the information recorded in the driver's logbook. As shown in FIG. 2, the driver emerges from a sleeper berth at 1:00 am and begins driving the vehicle, as shown as point 202. At 6:00 am the chart shows that the driver stopped driving, but remained on-duty but not-driving at point 204. The driver remained at this status until 7:00 am, when he returned to the sleeper berth to rest, shown as point 206. At 11:30 am, the driver again begins driving, shown as point 208. At 4:30 pm, the driver stops driving, but remains on-duty, shown as point 210. At 6:30, the driver again enters the sleeper berth, shown as point 212. At 10:30 pm, the driver once again begins driving, shown as point 214, and continues driving until at least 12:00 midnight. Once the driver's hours at each state have been charted, the total number of hours spent in each state is tallied on the right side of the chart. As shown in FIG. 2, the driver had no hours off-duty, nine hours of rest in the sleeper berth, eleven and a half hours driving, and three and a half hours on-duty, but not driving. These numbers must be evaluated against the FHWA safety regulations, as will be explained later herein.

The present invention uses the wireless communication system described above to record and calculate the safety-related compliance data, with minimal driver intervention needed. A driver uses MCT 106 to enter a pre-assigned identification code and a vehicle operator status. As the status of the driver changes, the driver enters the new status information into the mobile communication terminal. The driver identification code and status information is processed automatically, either on-board the vehicle, or at a central station, to generate safety-related compliance data. The safety-related compliance data may then be displayed at the vehicle when desired.

Figure 3:
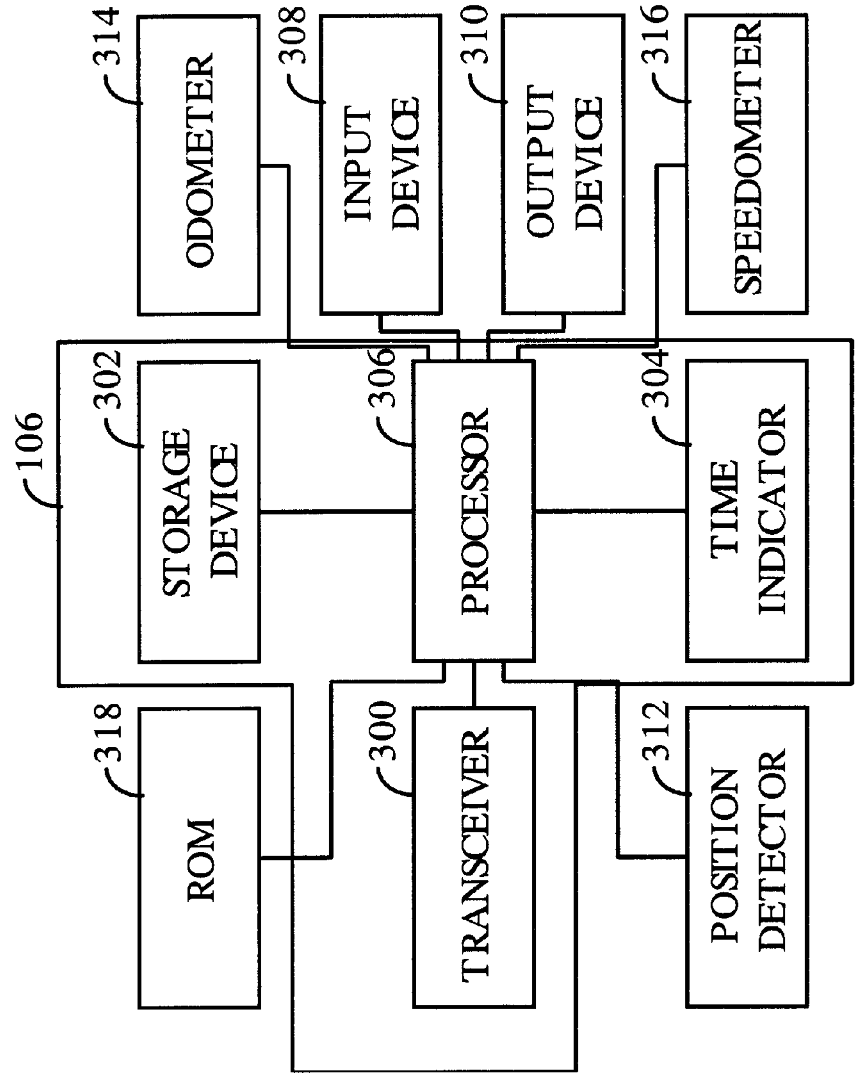
FIG. 3 illustrates a block diagram view of a mobile communication terminal and peripheral devices located on a vehicle in the communication system of FIG. 1.

FIG. 3 illustrates a detailed view of the mobile communication terminal and peripheral devices as used in the first embodiment of the present invention. Shown is MCT 106 comprising transceiver 300, storage device 302, time indicator 304, and processor 306. Also shown is input device 308, output device 310, position detector 312, odometer 314, speedometer 316, and ROM 318. It should be understood that each vehicle in the communication system of FIG. 1 has its own MCT 106.

Prior to operating vehicle 102, a vehicle operator, or driver, logs on to MCT 106 by entering an identification code and a vehicle operator status using input device 308. The identification code and vehicle operator status may be entered as part of a macro message indicating, for example, that a driver is enroute to his or her first load pickup. MCT 106 can also accept more than one vehicle operator being logged on at once. This situation might occur, for example, when a pair of vehicle operators are assigned to a vehicle, driving in shifts. In this case, one driver would log on as "driving" and the other would log on as "on-duty, not driving". Vehicle operator status is described in detail below.

The vehicle operator identification code is any alphanumeric sequence which uniquely identifies the vehicle operator to the communication system. Typically, the identification code comprises a user name and a password, a driver's social security number, or employee number. The identification code could also be represented by a number of different techniques. For example, if input device 308 is a card reading device using well-known techniques to read magnetically or optically encoded data from a card, the identification code could be encoded onto the card, then read by the card reading device. In another embodiment, input device 308 could be receptive to audible commands from a driver, such that the identification code would take the form of a word, phrase, or other audible command.

The vehicle operator status is generally entered anytime there is a change to the vehicle operator's status. The change in status may be done explicitly, by a driver entering a new status using input device 308, or implicitly by sending a macro which, by definition, indicates a change of status. For example, if a driver arrives at a destination and sends a macro indicating his arrival, it may be implied that the driver's status has changed. For example, the driver's status may have changed from driving to on-duty not driving. In the exemplary embodiment, four status are defined. The first vehicle operator status is typically referred to as "driving". This status refers to when a driver is actively operating a vehicle. In the case of a tractor-trailer vehicle, the driving status refers to the time when the driver is actually driving the vehicle, including necessary stops for traffic signals, stop signs, stops due to traffic jams, and so on.

The second vehicle operator status is typically referred to as "on-duty not driving" status. This status refers to when a driver is assigned to a vehicle, but not driving. For example, this status refers to the time when a vehicle operator is a passenger in a commercial vehicle while another driver operates the vehicle. This status can also refer to the time when a driver is at a plant, terminal, facility, or other property of a motor carrier or shipper, or on any public property, waiting to be dispatched; time spent inspecting, servicing, or conditioning a vehicle; the time spent in, or upon, a vehicle except time spent resting in a sleeper berth or driving time; time spent loading or unloading a vehicle, supervising, or assisting in the loading or unloading of a vehicle, attending a vehicle being loaded or unloaded; time spent waiting to operate a vehicle; time spent giving or receiving receipts for shipments to be loaded or unloaded; time spent repairing, obtaining assistance, or remaining in attendance upon a disabled commercial motor vehicle; time spent providing a breath sample or urine specimen, including travel time to and from the collection site, in order to comply with the random, reasonable suspicion, post-accident, or follow-up testing; time spent performing any other work in the capacity, employ, or service of a motor carrier; and time spent performing any compensated work for a person who is not a motor carrier.

The third vehicle operator status is typically defined as "sleeper berth" status or "rest" status. This status is when the vehicle operator is actually resting in a sleeper berth. This status does not include time spent sleeping or resting in any other location than a sleeper berth, such as a private residence, hotel, or motel.

The fourth vehicle operator status is typically defined as "off-duty" status. This status is when the vehicle operator is not on duty, is not required to be in readiness to work, or is not under any responsibility for performing work. The off-duty status may include time resting or sleeping in a residence, hotel, or motel, but generally does not include vacations, holidays, and other prolonged periods of time when a vehicle operator is not assigned to a vehicle.

Any time that the vehicle operator's status changes, an entry reflecting the change should be made using input device 308. The identification code need not be entered at every status change. In one embodiment, a driver need not enter the driver's identification code if the driver is the only driver logged onto the vehicle. In this case, it is assumed that any status changes that occur after an initial logon to MCT 106 should be attributed to the driver who is currently logged on. In another embodiment, each time a vehicle operator status changes, both the identification code and the new vehicle operator status must be entered into MCT 106. In still another embodiment, whenever two or more vehicle operators are logged onto MCT 106 and the operator's status is other than off-duty, an identification code generally will be entered into MCT 106 along with a change of operator status.

The vehicle operator identification code and status are received by processor 306, then stored in storage device 302. Storage device 302 is typically an integrated circuit capable of storing relatively large amounts of driver identification and status information. A common form of storage device 302 is a random access memory (RAM). Other types of storage devices well known in the art may be used in alternative embodiments, such as disk drives and magnetic or optical tape drives. Storage device 302 may also store information relating to the operation of MCT 106 or information relating to external electrical devices which are controlled by MCT 106.

Storage device 302 typically stores each status change entry sequentially along with the date and time that the entry was made. Time indicator 304 provides a time stamp to processor 306 each time a status change is received from input device 308. Processor 306 then stores the identification code (if provided), vehicle operator status, and the time stamp in storage device 302. Other information may be stored along with each vehicle operator status entry. For example, the vehicle's current position as determined by position detector 312, the vehicle's current speed as provided by speedometer 316, and/or the current vehicle odometer reading provided by odometer 314 may be stored in a data record along with the status and/or identification code. Other examples of additional data which could be stored include a vehicle identification number, an employee number assigned to the vehicle operator, a social security number assigned to the vehicle operator, the elapsed time that the vehicle operator has operated the vehicle, the name of the nearest city and state closest to the current vehicle location, the direction that the vehicle is traveling, or a code identifying the current trip or delivery route in which the vehicle is currently engaged. Time indicator 304 may be a discreet component, integrated circuit, incorporated into processor 306 or storage device 302, or the time and date may be generated by a software program resident in storage device 302 or another memory (not shown).

Entries into storage device 302 are saved until the capacity of storage device 302 is exceeded or until the identification/status information is requested by central station 104. If the capacity of storage device 302 is exceeded, generally any new status changes are stored by removing the most dated entry, allowing the new status change to be recorded. Alternatively, if a request is received from central station 104 to download some or all of the contents of storage device 302, processor 306 may provide transceiver 300 with the requested data, then delete the corresponding data entries in storage device 302.

As described above, MCT 106 records driver identification codes, status, and time stamps during vehicle operation. Under FHWA regulations, drivers must be able to provide proof of their activities for seven days as recorded in a logbook preceding a request to provide such information, referred to herein as safety-related compliance data. The safety-related compliance data may be required at weigh stations or whenever requested by a law enforcement officer. The present invention allows proof of a driver's safety-related compliance data upon request.

When proof of a driver's safety-related compliance data is requested, the information can be provided by entering the request using input device 308. The driver's identification code may be required to instruct MCT 106 which driver's activities are being requested for situations where multiple drivers are assigned to one vehicle. The request is received by processor 306, which uses the identification codes, status, and time stamps to calculate the safety-related compliance data as requested. This is done by processor 308 adding the times for each status together, as recorded in storage device 302, and tallying the times spent by the driver in each vehicle operator status, over a predetermined time period. Other time periods may be requested along with the activity request, if desired. The safety-related compliance data can be displayed using output device 310 which is typically a visual display device, well known in the art. The data can be displayed in graphical or table format. Output device 310 could alternatively comprise other means for communicating the safety-related compliance data, such as an audio system or a printing device.

In addition to displaying the safety-related compliance data, processor 306 can compare the safety-related compliance data to a predetermined set of safety criteria, stored in storage device 302 or in another memory (not shown). The safety criteria in the exemplary embodiment are the FHWY rules concerning the number of continuous hours that drivers may operate commercial vehicles over various time periods. Currently, the FHWA imposes what is commonly referred to as the 10, 15, and 70 hour rules on drivers, as explained below. If the safety-related compliance data is out of compliance with said predetermined set of safety criteria, a violation of the safety criteria is noted by processor 306, and an alert is generated corresponding to the violation. The alert may be sent to output device 310 in the form of an audible or visual signal, alerting the driver that he/she is in violation of the safety criteria. The alert may also be sent to host 100 corresponding to the vehicle 102 and driver which has generated the alert. Finally, a record of the violation may be created by processor 306 and stored in storage device 302 or in another storage device (not shown). The record may contain the driver's name, employee number, social security number, the time and date of the violation and other information. When a status change is received by processor 306 corresponding to the driver who is in violation of the safety criteria, processor 306 can additionally calculate the number of hours that the driver has been in violation, and amend the record stored in storage device 302. Alternatively, or in addition to storing the record in storage device 302, processor 306 may send the violation record to central station 104 automatically, either during the initial creation of the violation record or after the driver has changed status, thereby allowing the violation time length to be calculated and included as part of the record sent to central station 104.

The 10, 15, and 70 hour safety rules imposed by the DOT are defined in 49 Code of Federal Regulations (C.F.R.) §395.3 as follows:

"(a) . . . no motor carrier shall permit or require any driver used by it to drive nor shall any such driver drive:

(a)(1) More than 10 hours following 8 consecutive hours off duty; or (a)(2) For any period after having been on duty 15 hours following 8 consecutive hours off duty.

(b) No motor carrier shall permit or require a driver of a commercial motor vehicle to drive, nor shall any driver drive, regardless of the number of motor carriers using the driver's services, for any period after—

(b)(1) Having been on duty 60 hours in any 7 consecutive days if the employing motor carrier does not operate commercial motor vehicles every day of the week; or (b)(2) Having been on duty 70 hours in any period of 8 consecutive days if the employing motor carrier operates commercial motor vehicles every day of the week."

Processor 306 executes one or more software programs stored in read-only memory (ROM) 318 which compares the current time, as indicated by time indicator 304, to the entries stored in storage device 302 and determines whether or not one or more drivers logged onto MCT 106 are in violation of the safety criteria. ROM 318 does not necessarily have to be a read-only memory. It can alternatively be a random-access memory (RAM), electrically erasable programmable read-only memory, or other electronic storage device known in the art.

Processor can also determine the number of hours that a driver can continue to operate the vehicle, using the entries in storage device 302, the current time as provided by time indicator 304, and the safety criteria. This information can be especially helpful to the motor carrier for which the driver is employed. Knowing the number of hours that each driver in its fleet can continue to drive without a safety violation, carriers can more effectively plan routes and assign drivers to vehicles based on this data. The number of hours that a driver can continue to operate a vehicle can be continuously updated and stored as a data record in storage device 302. The data record may contain the following information: a vehicle identification number, a driver employee number, a driver identification code, a driver social security number, an average speed of vehicle 102 under the control of the driver, the drive time remaining under the 10 hour rule, the drive time remaining under the 15 hour rule, the drive time remaining under the 70 hour rule, as well as other information. Alternatively, or in addition, the remaining driving hours and/or other information, can be transmitted at predetermined time intervals to central station 104.

In a second embodiment of the present invention, vehicle operator status information is recorded and safety-related compliance data calculated at either central station 104 or at host 100. This embodiment minimizes the hardware and software needed on-board vehicle 102, thus reducing size and costs to motor carriers.

Figure 4:
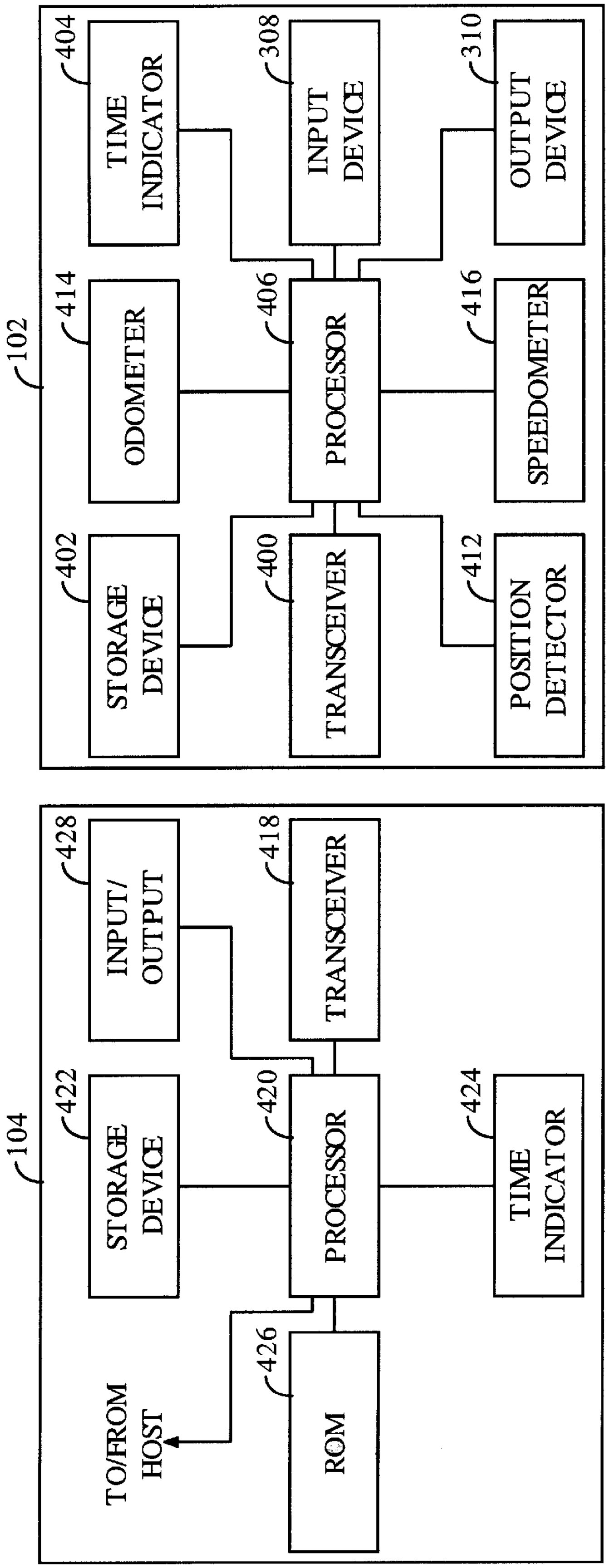
FIG. 4 illustrates the communication system of FIG. 1 used in the second or third embodiments of the present invention.

FIG. 4 details the components used in accordance with the second and third embodiments of the present invention. In these embodiments, vehicle 102 contains MCT 106, comprising many of the same components used in accordance with the first embodiment of the present invention as discussed above.

In the second and third embodiments, one or more vehicle operators logon to MCT 106 by entering an identification code and a vehicle operator status using input device 408. MCT 106 can accept more than one vehicle operator being logged on at once. The vehicle operator identification code is any alpha-numeric sequence which uniquely identifies the vehicle operator to the communication system. Typically, the identification code comprises a user name and a password, or simply a driver's social security number. The identification code could also be represented by a number of different techniques, as discussed above.

The vehicle operator status is generally entered anytime there is a change to the vehicle operator's status. In the exemplary embodiment, four status are defined. They are the "driving" state, the "on-duty, not driving" state, the "sleeper berth" state or the "rest" state, and the "off-duty" state. These states are the same states as previously discussed above.

Any time that the vehicle operator's status changes, an entry reflecting the change should be made by a vehicle operator using input device 308. Depending on the implementation of the present invention, the identification code may or may not need to be entered for every status change, as discussed above.

The vehicle operator identification code and status are received by processor 406, formatted into an appropriate transmission protocol, then transmitted to central station 104. Other information may be appended to the transmission as well. For example, the vehicle speed as provided by speedometer 416, the location of vehicle 102 as determined by position detector 412, the odometer reading as provided by odometer 414, or the current time as provided by time indicator 404, could be appended to the vehicle operator identification code and status information. Position detector 412 may be any device well-known in the art for determining the location of a vehicle, such as a device based on the well-known Global Position System (GPS).

In the third embodiment, the vehicle operator identification code and vehicle operator status is stored in storage device 402 whenever one or the other, or both, are received from input device 408. Storage device 402 typically stores each status change entry sequentially along with the date and time that the entry was made. Time indicator 404 provides a time stamp to processor 406 each time a status change is received from input device 408. Processor 406 then stores the identification code (if provided), vehicle operator status, and the time stamp in storage device 402.

Again in the third embodiment, entries into storage device 402 are saved until a predetermined event occurs. In exemplary embodiment, the predetermined event is when a predefined time is reached, as indicated by processor 406 and time indicator 404. Generally, the predefined time is set to a time when the cost of transmitting messages decreases. For example, in many satellite communication systems, messages are less expensive to transmit late at night or early morning because generally there is far less traffic being transmitted at these hours. Therefore, in the exemplary embodiment, data stored in storage device 402 is saved until the predefined time is reached, then processor 406 formats the data and transmits it to central station 104 in far fewer messages than if each status change was transmitted individually. Generally, only a single predefined time period is defined so that data is transmitted once per day, however, data could be transmitted at intervals greater or less than once per day. Another advantage of transmitting data in storage device 402 at a predefined time is that total message length of a combined message is typically shorter than the combined length of individually transmitted messages. In typical satellite communication systems, customers are charged, among other things, by the length of each message transmitted. Therefore, significant cost savings can be achieved by grouping the data stored in storage device 402 and transmitting it once per day or less.

Referring again to FIG. 4, in either the second or third embodiment, vehicle operator identification and status information is transmitted from transceiver 400 to transceiver 418, located at central station 104. The information is generally received by processor 420, then stored in storage device 422. Other information corresponding to the identification and status information may be stored in storage device 422 as well, such as the current vehicle speed, vehicle location, MCT serial number, vehicle identification number, and odometer reading transmitted along with the identification and status information. In the second embodiment, a time stamp provided by time indicator 424 indicating the date and time that the identification and status information was received is stored along with the vehicle operator identification code and status in storage device 422.

The identification and status information remains stored in storage device 422 until an activity request is received by processor 420 via input/output device 428, or through a request transmitted by transceiver 400, to process the information. The activity request contains information identifying the driver for which the safety-related compliance data is to be calculated. Processor 420 uses the stored identification code, status, and time stamps to calculate the safety-related compliance data as requested. This is done by processor 420 adding the times for each status together, as recorded in storage device 422, and tallying the times spent by the driver in each vehicle operator state, over a predetermined time period. Other time periods may be specified along with the activity request, if desired.

Once the number of hours of service in each status is determined, processor 420 can compare the safety-related compliance data to a predetermined set of safety criteria, stored in storage device 422 or in another storage device (not shown). The safety criteria in the exemplary embodiment are the FHWA rules concerning the number of hours that drivers may operate commercial vehicles over various time periods. Currently, the FHWA imposes what is commonly referred to as the 10, 15, and 70 hour rules on drivers, as explained above. If the safety-related compliance data is out of compliance with said predetermined set of safety criteria, a violation of the safety criteria is noted by processor 420, and an alert is generated corresponding to the violation. The alert may be sent to I/O 428 in the form of an audible or visual signal, alerting the driver that he/she is in violation of the safety criteria. Furthermore, the alert, alternatively or in addition, be sent to host 100 corresponding to the vehicle 102 and driver which generated the alert. Finally, the alert may alternatively, or in addition, be saved as a record in storage device 422 or anther memory (not shown), corresponding to the vehicle operator in violation of the safety criteria. The record may contain the driver's name, employee number, social security number, the time and date of the violation and other information. When a status change is received by processor 420 corresponding to the driver who is in violation of the safety criteria, processor 420 can additionally calculate the number of hours that the driver has been in violation, and amend the record stored in storage device 422 as well as notify I/O 428, host 100, and/or vehicle 102, whichever the case may be.

In another embodiment, a vehicle operator status update is automatically performed at predetermined time intervals for each driver recorded in storage device 422. The update is performed periodically to determine any driver who is in violation with the safety criteria. The current time as provided by time indicator 424 is used to calculate the safety-related compliance data, then the data is compared to the predetermined set of safety criteria to determine violations.

In addition to displaying the safety-related compliance data, processor 420 can also determine the number of hours that a driver can continue to operate the vehicle, using the entries in storage device 422, the current time as provided by time indicator 424, and the safety criteria. This information can be especially helpful to the motor carrier for which the driver is employed. Knowing the number of hours that each driver in its fleet can continue to drive without a safety violation, carriers can more effectively plan routes and assign drivers to vehicles based on this data.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. Apparatus for calculating safety-related compliance data for a vehicle operator assigned to a vehicle, comprising:

a mobile communication terminal comprising:

an input device for entering an identification code and a vehicle operator status;

a time indicator for providing a time stamp corresponding to said vehicle operator status entry;

a storage device connected to said input device and said time indicator for storing said identification code, said vehicle operator status, and said corresponding time stamp;

a processor connected to said storage device for processing said identification code, said status information, and said time stamp to determine said safety-related compliance data.

a transmitter for transmitting said safety-related compliance data to a central station only upon the occurrence of a predetermined event.

2. The apparatus of claim 1 wherein said predetermined event is a request from said central station to transmit said safety-related compliance data.

3. The apparatus of claim 1 further comprising a display device for displaying said safety-related compliance data at said vehicle.

4. The apparatus of claim 1 wherein said safety-related compliance data comprises information relating to the number of hours that a vehicle operator has been operating said vehicle.

5. The apparatus of claim 1 wherein said vehicle operator status is selected from the group consisting of driving, on-duty not driving, resting, or off-duty.

6. The system of claim 1 wherein said processor is further for comparing said safety-related compliance data to a predetermined set of safety criteria and generating an alert if said safety-related compliance data is out of compliance with said predetermined set of safety criteria.

7. A method for recording and calculating safety-related compliance data for a vehicle operator assigned to a vehicle, comprising the steps of:

entering an identification code and a vehicle operator status into an input device located on said vehicle;

storing said identification code, said vehicle operator status, and said time stamp in a storage device located at said vehicle;

determining, implicitly, said safety-related compliance data using said identification code, said vehicle operator status, and said time stamp;

displaying said safety-related compliance data at said vehicle; and transmitting said safety-related compliance data to a central station only upon the occurence of a predetermined event.

8. Apparatus for calculating safety-related compliance data for a vehicle operator assigned to a vehicle, comprising:

a mobile communication terminal comprising:

an input device for entering an identification code;

a time indicator for providing a time stamp corresponding to said vehicle operator status determination;

a storage device connected to said input device and to said time indicator for storing said identification code and said corresponding time stamp;

a processor connected to said storage device for determining said vehicle operator status based on messages and for determining said safety-related compliance data based on said identification code, said vehicle operator status, and said time stamp; and transmitting said safety-related compliance data to said central station only upon the occurence of a predetermined event.

9. A method for recording and calculating safety-related compliance data for a vehicle operator assigned to a vehicle, comprising the steps of:

entering an identification code into an input device located on said vehicle;

transmitting a message from said vehicle to a central station;

determining a vehicle operator status from said message;

storing said identification code, said vehicle operator status, and said time stamp in a storage device located at said vehicle;

calculating said safety-related compliance data using said identification code, said vehicle operator status, and said time stamp; and transmitting said safety-related compliance data to a central station only upon the occurence of a predetermined event.

10. A method for recording and calculating safety-related compliance data for a vehicle operator assigned to a vehicle, comprising the steps of:

entering an identification code and a vehicle operator status into an input device located on said vehicle;

storing said identification code, said vehicle operator status, and said time stamp in a storage device located at said vehicle;

calculating said safety-related compliance data using said identification code, said vehicle operator status, and said time stamp;

displaying said safety-related compliance data at said vehicle; and transmitting said safety-related compliance data to a central station only upon the occurence of a predetermined event.

11. The system of claim 10 wherein said safety-related compliance data comprises information relating to the number of hours that a vehicle operator has been operating said vehicle.

12. The apparatus of claim 10 wherein said vehicle operator status is selected from the group consisting of driving, on-duty not driving, resting, or off-duty.

13. The method of claim 10 further comprising the step of comparing said safety-related compliance data to a predetermined set of safety criteria and generating an alert if said safety-related compliance data is out of compliance with said predetermined set of safety criteria.

* * * * *

UNITED STATES PATENT AND TRADEMARK OFFICE

CERTIFICATE OF CORRECTION

PATENT NO. : 6,421,590 B2

APPLICATION NO. : 09/813418

DATED : July 16, 2002

INVENTOR(S) : Thomas Thibault

It is certified that error appears in the above-identified patent and that said Letters Patent is hereby corrected as shown below:

On Title Page item (63) Continuation of application No. 09/363,971, filed on July 29, 1999, now abandoned; should be corrected to read -- Continuation of application No. 09/363,971, filed on July 29, 1999, now US Patent No. 6,317,668, issued November 13, 2001 --

Signed and Sealed this

Eighth Day of April, 2008

JON W. DUDAS

*Director of the United States Patent and Trademark Office*